3 Sheets—Sheet 1.

G. JULIAN.

SOLE ROUNDING MACHINE.

No. 11,501. Reissued July 2, 1895.

Attest
A. D. Harrow
Rollin Abell

Inventor.
G. Julian
by Wright Brown & Quinby
Attys.

THE NORRIS PETERS CO., WASHINGTON, D. C.

3 Sheets—Sheet 2.

G. JULIAN.

SOLE ROUNDING MACHINE.

No. 11,501. Reissued July 2, 1895.

Attest.
A. D. Harrison.
Rollin Abell.

Inventor
G. Julian
by Wright Brown & Quinby
Attys.

THE NORRIS PETERS CO., WASHINGTON, D. C.

3 Sheets—Sheet 3.
G. JULIAN.
SOLE ROUNDING MACHINE.
No. 11,501. Reissued July 2, 1895.
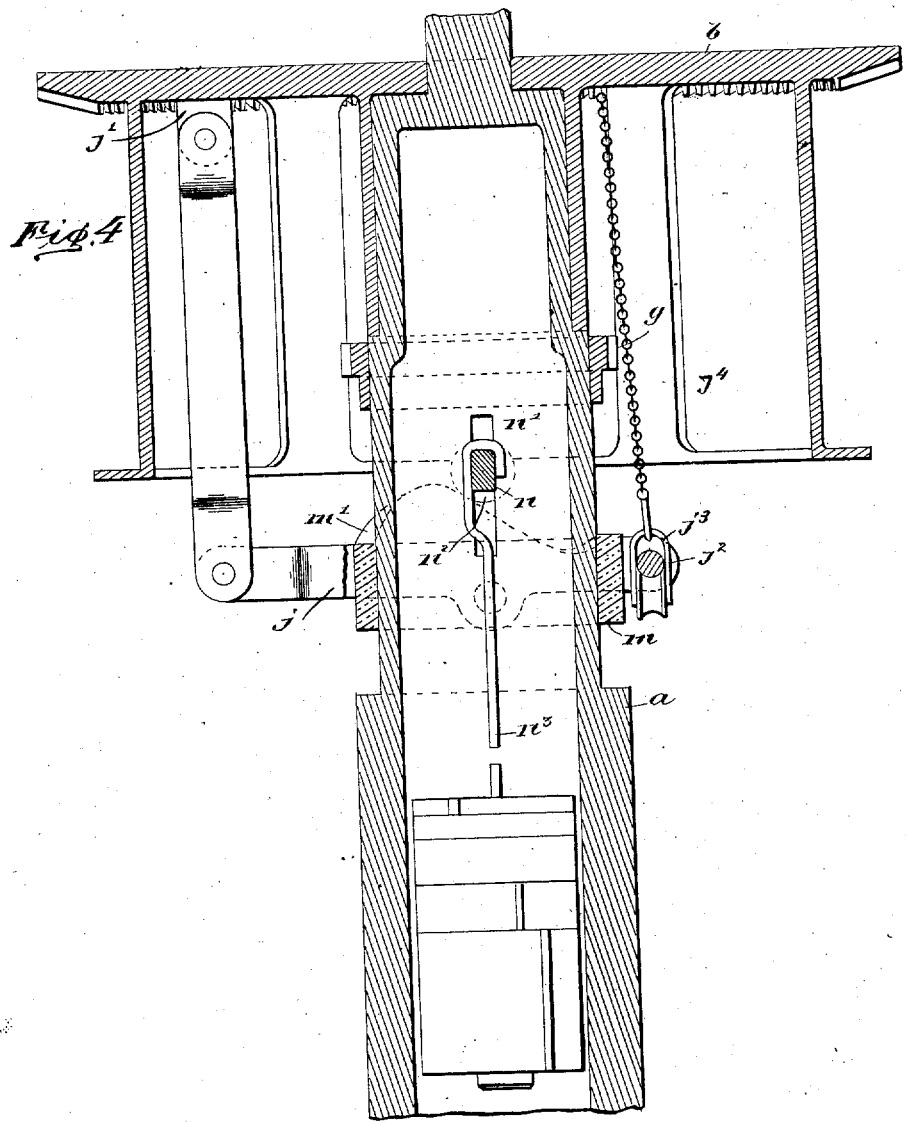
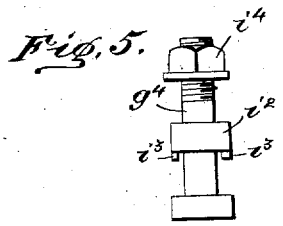
Attest.
A. D. Harrison
Rollin Abell.
Inventor.
G. Julian
by Wright Brown & Quinby
Attys.
THE NORRIS PETERS CO., WASHINGTON, D. C.

UNITED STATES PATENT OFFICE.

GIDEON JULIAN, OF BOSTON, ASSIGNOR, BY DIRECT AND MESNE ASSIGNMENTS, TO CHARLES F. BROWN, TRUSTEE, OF READING, MASSACHUSETTS.

SOLE-ROUNDING MACHINE.

SPECIFICATION forming part of Reissued Letters Patent No. 11,501, dated July 2, 1895.

Original No. 528,128, dated October 23, 1894. Application for reissue filed April 9, 1895. Serial No. 545,114.

*To all whom it may concern:*

Be it known that I, GIDEON JULIAN, of Boston, in the county of Suffolk and State of Massachusetts, have invented certain new and useful Improvements in Sole-Rounding Machines, of which the following is a specification.

This invention relates to certain improvements in sole rounding or trimming machines such as employed in making soles for boots and shoes.

One object of the invention is to provide less complicated and more practical and efficient means than heretofore devised for producing the desired variation in rate of travel of the knife, involving acceleration of the same over the longitudinal sides of the work and retardation thereof when rounding the ends of the work, where more or less abrupt turns are made.

Another object of the invention is to secure a better effect of the weight employed to hold the knife to the form by insuring quicker action and thereby making the knife's travel absolutely accurate and positive.

To the above ends the invention may be said to consist in the combination of a rotary table, a knife-carrier movable back and forth thereon, a fixed gear, and a planet-gear carried by the table and meshing with the fixed gear, said planet-gear having a crank which is connected with the knife-carrier.

The invention further consists in the combination of a rotary table, an independently-movable knife-carrier thereon, a lever carried by the table and connected with the knife-holder, a cam supported by said lever, a bearing-piece resting on the cam, and a weight suspended from the said bearing-piece.

The invention also includes incidentals to the above, all of which are fully described hereinafter and pointed out in the claims.

The accompanying drawings illustrate an embodiment of the invention.

Figure 1:
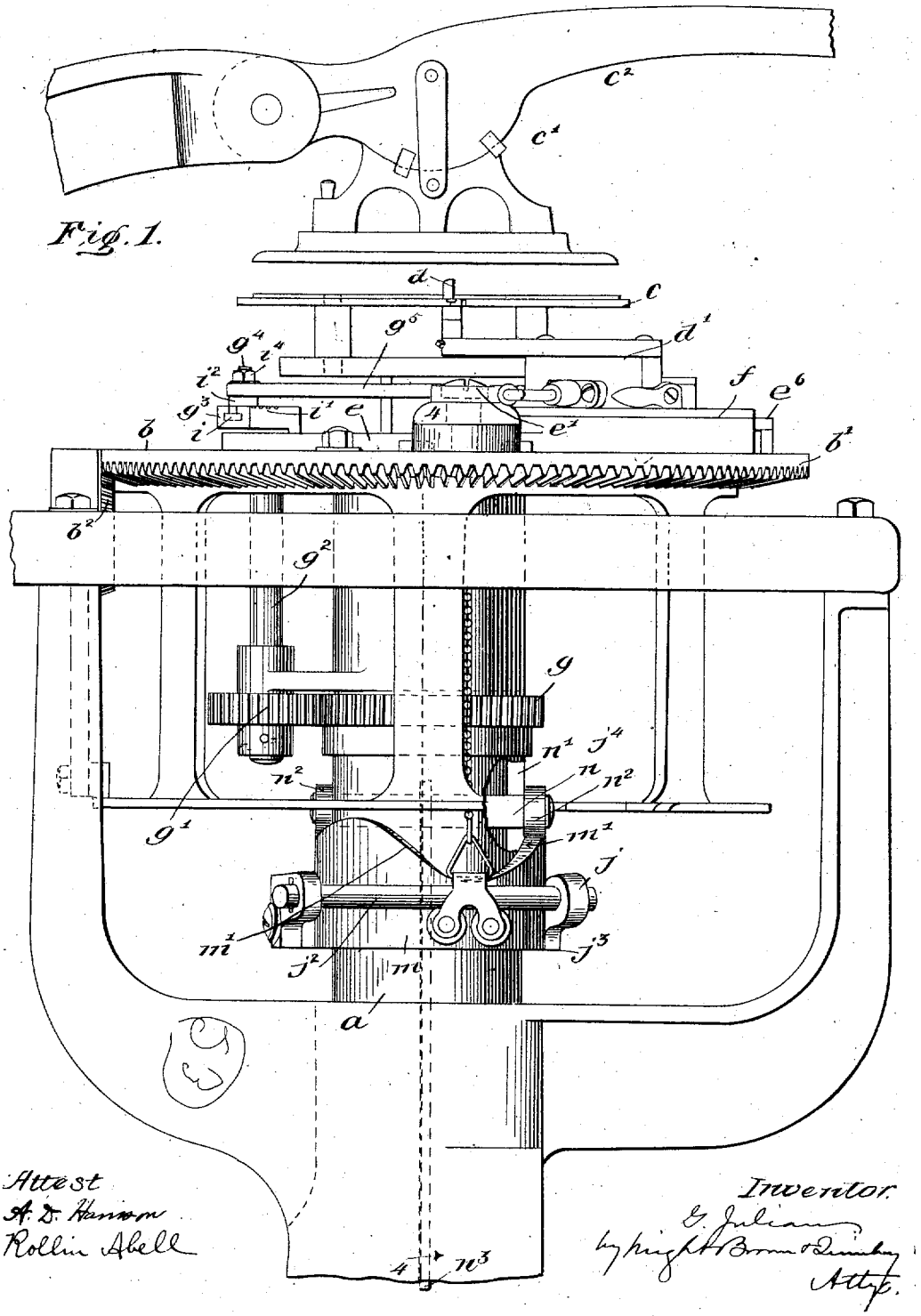
Figure 2:
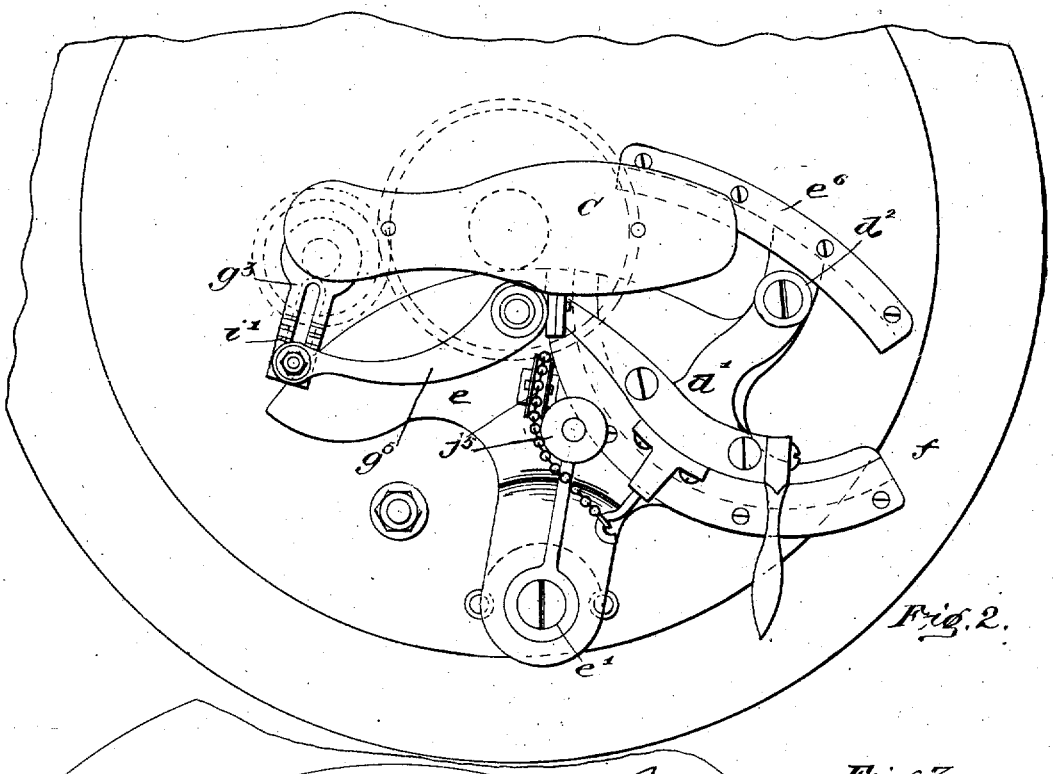
Figure 3:
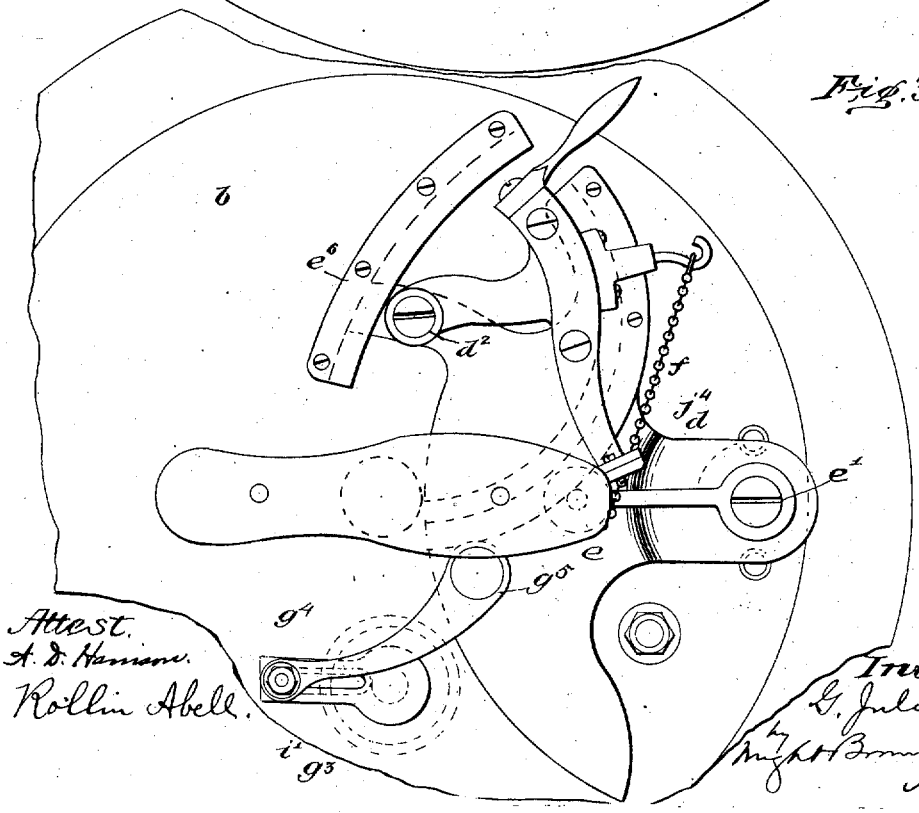

Figure 1 shows a side elevation of the machine. Fig. 2 shows a top plan view with the knife at a point in its traverse of one side of the work. Fig. 3 shows a similar view with the knife at one corner of the toe end of the work. Fig. 4 shows a vertical section on line 4 4 of Fig. 1. Fig. 5 is a detail hereinafter referred to.

The same letters of reference indicate the same parts in all the figures.

In the drawings, the letter $a$ designates a column which supports a rotary table $b$, having a bevel-gear $b'$ formed on its under side and engaged by a driving-pinion $b^2$. A form or pattern $c$ is fixedly supported above the table, centrally thereof, and the leather to be cut is held thereon by a clamp $c'$, which is operated by a lever $c^2$. The cutting-knife $d$ is suitably supported in a holder $d'$, which is pivoted at $d^2$ to a segmental carrier $e$, the latter being pivoted at $e'$ to the table $b$. The holder is yieldingly actuated toward the pattern $c$ through devices hereinafter described, so as to hold the knife to the edge of the pattern. The rotation of the table carries the knife around the pattern, which properly guides it through the work.

The knife-holder is confined and firmly guided in movement on its pivot by an arc-shaped gib $f$, fastened to the carrier $e$, and the latter is similarly confined by a gib $g^6$, fastened to the table.

It is found desirable in this class of machines to vary the rate of travel of the knife, in view of the shape of the product. The long sides offer opportunity for speeding the knife; whereas, in turning the abrupt corners of a square toe, so called, and in rounding the heel, the cutter must be retarded, and, in fact, the cutter should dwell momentarily in turning the corner of the square toe. The back-and-forth movement of the carrier $e$, caused by the hereinafter-described independent oscillations of the carrier on its pivot, is employed to effect the desired variation in speed.

A fixed gear $g$ is arranged below the table and concentric therewith, and a smaller gear $g'$ meshes therewith and is supported in a bearing on a hub of the table, so as to be carried around the fixed gear by the table, the said two gears $g$ and $g'$ constituting what is known as a "sun-and-planet" gearing. The stem or spindle $g^2$ of the planet-gear $g'$ extends up through the table and a crank $g^3$ is affixed to it and carries a wrist-pin $g^4$. This wrist-pin is connected by a pitman $g^5$ with the carrier $e$. It will be seen that the stroke of the crank in one direction tends to move the said carrier on its pivot in that direction, while the stroke in the opposite direction tends to move the said carrier correspondingly.

The fixed or "sun" gear $g$ has twice as many teeth as the "planet" gear, and hence the latter makes two complete revolutions in describing its orbit about the fixed gear. The relative location of the pattern $c$ and the knife-controlling parts is such that the knife-holder moves along the longitudinal sides of the pattern during the movement of the crank, which moves the carrier forward or in the same direction with the part of the table to which the carrier is connected. Hence the speed of the knife is accelerated, whereas the knife-holder moves along the ends of the pattern during the opposite movement of the crank and while the carrier is moving in a direction opposite to that in which the corresponding portion of the table is moving. Hence the speed of the knife is retarded.

It will be seen that the carrier has independent back-and-forth or forward and backward movements, each forward movement taking place when the knife-holder is on a side-portion of the pattern and each backward movement taking place when the knife-holder is on an end portion of the pattern; so that in trimming the side portions of the sole the knife has not only the movement imparted by the rotation of the table, but also the added forward movement of the carrier, whereas in trimming the end portions of the sole the knife has only the movement imparted by the rotation of the table, less the backward movement of the carrier.

The throw of the crank may be varied to suit different patterns which may be used, the construction here shown for accomplishing this being as follows: The crank has a longitudinally extending T-shaped groove $i$, and the wrist-pin has a correspondingly formed head engaging said groove. The crank is formed on either side of the slot with a series of notches $i'$, and a collar $i^2$ on the wrist-pin has lugs $i^3$ for engagement with the notches. (See Fig. 5.) A nut $i^4$ on the pin provides means for locking the pin at different adjustments.

It will be seen that my arrangement does away entirely with the cam which has heretofore been employed to control the knife-carrier.

As hereinbefore stated, my invention contemplates, in addition to the above, improved means for holding the knife up to the pattern, and these will now be described. A forked lever $j$ is pivotally connected at one end with a bearing $j'$ on the under side of the table, and its arms extend on opposite sides of the column $a$, and their ends are connected by a rod $j^2$, which is embraced by a roller-provided traveler $j^3$, the latter being connected by a chain $j^4$ with the knife-holder $d$, and the chain passing over suitably-arranged pulleys $j^5$. A similar arrangement is shown in a former patent granted to me February 17, 1891, No. 446,686, and in the construction there shown the lever carries a ring which is designed to move longitudinally and to rotate on the central column, and another ring rests upon it but is non-rotatable and carries a cross-piece, from which a weight is suspended. In this arrangement the weight moves up and down as the knife follows the pattern, the downward movement taking place when the knife traverses the shank portion of the pattern. I have found that under this arrangement the tardiness of the weight is objectionable, and have therefore devised a construction which overcomes this difficulty. A collar $m$ loosely surrounds the column $a$ and has trunnions which journal in the arms of the lever $j$, and the upper surface $m'$ of said collar is given an undulating cam-form, there being two diametrically-opposite depressions and corresponding rises. A cross-bar $n$ extends through slots $n'$ in opposite sides of the column, and its protruding ends are provided with rollers $n^2$, which rest on the cam $m'$. A weight is suspended by a rod $n^3$ from the said bar $n$. It being understood that the collar $m$ rotates around the column with the table, it will be seen that a proper relative location of parts will cause rises in the cam-surface to act on the rollers when the knife moves into the shank portions of the pattern and depressions in the cam permit the outward movement of the knife. The cam takes up the up-and-down motion of the weight which would otherwise occur, so that there is little if any movement of the weight.

The coaction of the cam and the weight effects a prompt and positive adaptation of the knife to the contour of the pattern.

It is evident that the invention here disclosed is capable of embodiment varying more or less from that here illustrated, and hence is not limited in this respect.

I claim—

1. A sole-rounding machine comprising in its construction a rotary table, a knife-carrier movable back and forth on the table, a stationary gear, and a movable gear carried by the rotary table and connected with said stationary gear, said movable gear having a crank which is connected with the knife-carrier.

2. A sole-rounding machine comprising in its construction a rotary table, a knife-carrier movable back and forth on the table, a stationary gear, a movable gear carried by the rotary table and connected with said stationary gear, said movable gear having a crank, and a pitman connecting the knife carrier and the said crank and adjustably connected with the latter.

3. A sole-rounding machine comprising in its construction a rotary table, a knife-holder movable back and forth thereon, a lever carried by the table and connected with the said holder, a cam carried by said lever, a bearing-piece resting on the cam, and a weight suspended from said bearing-piece.

4. A sole-rounding machine comprising in its construction a supporting column, a rotary table, an independently movable knife-holder thereon, a lever pivoted to the under side of the table and embracing the column, a flexible connection between the lever and the knife-holder, a cam encircling the column and supported by the lever, a cross-bar extending through the column and bearing on the cam, and a weight suspended from the said cross-bar.

5. In a sole-rounding machine, the combination of a pattern, a trimming-knife, a holder therefor, a knife-carrier supporting said holder, a table or support for said carrier, mechanism substantially as described for changing the positions of the support and carrier relatively to the pattern to cause a progressive cutting action of the knife, a shaft journaled in said support and provided with a crank which is connected with the knife-carrier, and means for positively rotating said shaft and thereby imparting a positive independent back-and-forth movement to the knife-carrier, whereby the cutting action of the knife is alternately accelerated and retarded.

GIDEON JULIAN.

Witnesses:
WILLIAM QUIMBY,
CHARLES S. HULL.